United States Patent [19]
White

[11] Patent Number: 5,987,803
[45] Date of Patent: Nov. 23, 1999

[54] FISHING ROD HOLDER

[76] Inventor: Charles W. White, Rt. 2, Box 253-B, Delmar, Del. 19940

[21] Appl. No.: 08/766,778

[22] Filed: Dec. 13, 1996

[51] Int. Cl.⁶ .................................................. A01K 97/10
[52] U.S. Cl. .............................................................. 43/21.2
[58] Field of Search ............................. 43/21.2; 248/512, 248/513, 534, 538

[56]             References Cited

U.S. PATENT DOCUMENTS

| | | | |
|---|---|---|---|
| 2,033,007 | 3/1936 | Raithel | 248/42 |
| 3,063,668 | 11/1962 | Yohe | 248/279 |
| 3,259,346 | 7/1966 | Rogers | 248/42 |
| 3,671,001 | 6/1972 | Hall, Sr. | 248/43 |
| 3,802,112 | 4/1974 | Banner | 43/21.2 |
| 3,964,706 | 6/1976 | Adams | 43/21.2 |
| 4,157,804 | 6/1979 | Byford | 248/512 |
| 4,485,579 | 12/1984 | Hawie | 43/21.2 |
| 4,793,086 | 12/1988 | Cup | 43/21.2 |
| 4,836,127 | 6/1989 | Willie | 248/538 X |
| 4,871,099 | 10/1989 | Bogar, Jr. | 224/42.45 R |
| 4,948,083 | 8/1990 | McNaney, Jr. et al. | 43/21.2 |
| 5,533,295 | 7/1996 | Hochberger | 43/21.2 |

*Primary Examiner*—David A. Scherbel
*Assistant Examiner*—Anthony Ojini
*Attorney, Agent, or Firm*—Roylance, Abrams, Berdo & Goodman, L.L.P.

[57]             ABSTRACT

A rod holder has a platform with upper and lower planar surfaces, and a support. The support has an upper portion and a lower portion, with the lower portion being rigidly connected to the lower surface of the platform. The lower portion of the support is adapted to be connected to a boat. A first rod receiving member has a first upper end and a first lower end, and a second receiving member has a second upper end and a second lower end. The first and second lower ends are coupled to the upper surface of the platform to pivot the first and second rod receiving members about first and second pivot axes, respectively, while prohibiting the first and second rod receiving members from moving relative to the platform in a direction that is parallel to the first and second pivot axes. The first and second pivot axes are perpendicular to the upper surface.

20 Claims, 5 Drawing Sheets

FISHING ROD HOLDER

FIELD OF THE INVENTION

The present invention relates to a rod holder that enables an existing single rod holder to receive multiple rods. More specifically, the invention relates to a fishing rod holder that can be inserted into a rod supporting aperture in a boat. The fishing rod holder supports multiple fishing rods while enabling each fishing rod to be pivoted 360° around a respective vertical pivot axis.

BACKGROUND OF THE INVENTION

While fishing, it is often desirable to employ fishing rod holders to avoid constantly holding the fishing rod with one's hands. Typical fishing rod holders are tubes attached to a boat or a dock that receive the butt of a fishing rod. This type of holder has the disadvantage of requiring a separate brace for attaching the tubes to the boat or dock. Also, these holders maintain the fishing rods in only one position.

Other known fishing rod holders are found within the upper edge or gunwale of the side or bulwark of a fishing boat. These holders are known as gunwale rod holders and are generally located on the starboard and port sides of a fishing boat. A gunwale rod holder is generally a tube that sits within the bulwark, inclined at an angle of about 30° from vertical, and open at the gunwale. Fishermen using gunwale rod holders are limited to the extent that each gunwale rod holder is capable of receiving only one fishing rod. Further, since the tube is fixed within the bulwark, a fishing rod within the gunwale rod holder can point in only one direction.

Presently, it is known to place a multiple fishing rod holder within a gunwale rod holder in order to support multiple fishing rods from a single gunwale rod holder. Such fishing rod holders have multiple tubes rigidly attached to a member that is inserted into the gunwale rod holder. However, these multiple fishing rod holders do not permit fishing rods to be pivoted relative to each other while they are supported by the gunwale rod holder. Each fishing rod must be lifted out of its original tube and placed into another tube if it is desired to change the direction of the fishing rod. This type of multiple fishing rod holder is exemplified by U.S. Pat. No. 4,485,579, to Hawie.

SUMMARY OF THE INVENTION

A primary object of the present invention is to provide a rod holder that adapts a single rod receiving member for receiving multiple rods.

A further object of the invention is to provide a rod holder that has two rod receiving members that are each capable of pivoting 360° about a respective vertical axis of rotation.

Another object of the invention is to provide a rod holder that is received in a gunwale rod holder of a boat and that, in turn, receives a fishing rod within each of two movable rod receiving members.

Still another object of the invention is to provide a rod holder for a boat having two rod receiving members for receiving fishing rods, each rod receiving member being capable of pivoting 360° about a respective vertical axis so that the fishing rods may be moved relative to each other and to the boat to avoid entanglement with other rods and with the boat.

The foregoing objects are substantially achieved by providing a platform having a planar upper surface and a lower surface and a support having an upper portion and a lower portion. The upper portion of the support is rigidly connected to the lower surface of the platform. The lower portion of the support is adapted to be connected to a boat. A first rod receiving member has a first upper end and a first lower end. A second rod receiving member has a second upper end and a second lower end. The first and second lower ends are coupled to the upper surface of the platform to pivot the first and second rod receiving members about first and second pivot axes, respectively, while prohibiting the first and second rod receiving members from moving relative to the platform in a direction that is parallel to the first and second pivot axes. The first and second pivot axes are perpendicular to the upper surface.

Other objects, advantages, and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings, which form a part of this disclosure.

DETAILED DESCRIPTION OF THE PREFERRED EMBODIMENT

Figure 1:
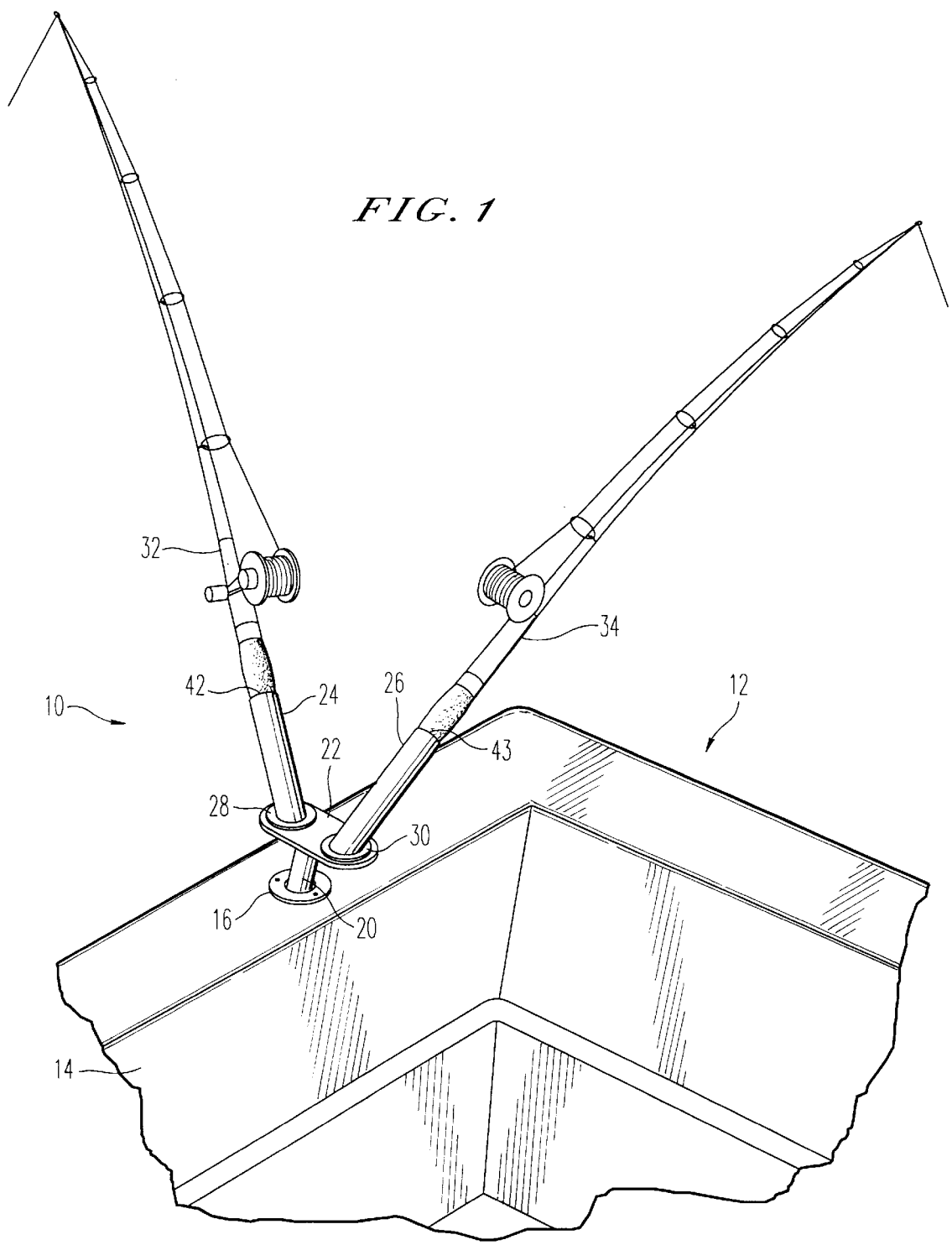
FIG. 1 is a perspective view of a rod holder in accordance with a preferred embodiment of the present invention, illustrating the rod holder placed in a gunwale rod opening in a boat, the rod holder supporting two fishing rods.

FIG. 1 illustrates a rod holder 10 in accordance with a preferred embodiment of the present invention. The rod holder 10 is secured to a boat 12 at the bulwark 14 in a gunwale rod holder 16. The gunwale rod holder 16 is known in the art as a hollow tube within the bulwark 14 that is inclined at approximately a 30° angle relative to vertical for receiving the butt of a single fishing rod.

The rod holder 10 comprises a support 20 inserted into the gunwale rod holder 16. The support 20 is attached to a platform 22 that, in turn, has first and second rod receiving members 24 and 26, respectively, attached thereon. The rod receiving members 24 and 26 pivot on bearing elements in the form of first and second bearing plates 28 and 30, respectively. Each rod receiving member 24 and 26 preferably receives one of the fishing rods 32 and 34.

The rod holder 10 enables two fishing rods 32 and 34 to be supported simultaneously where previously only one fishing rod could be supported in gunwale rod holder 16. Additionally, since rod receiving members 24 and 26 pivot on bearing plates 28 and 30, as described below, each fishing rod 32 and 34 can be selectively positioned as desired relative to each other and relative to the boat.

FIGS. 2–7 show the structure and operation of the rod holder 10. First and second rod receiving members 24 and 26 are hollow cylinders preferably made from aluminum. Rod receiving members 24 and 26 are substantially rigid.

Figure 2:
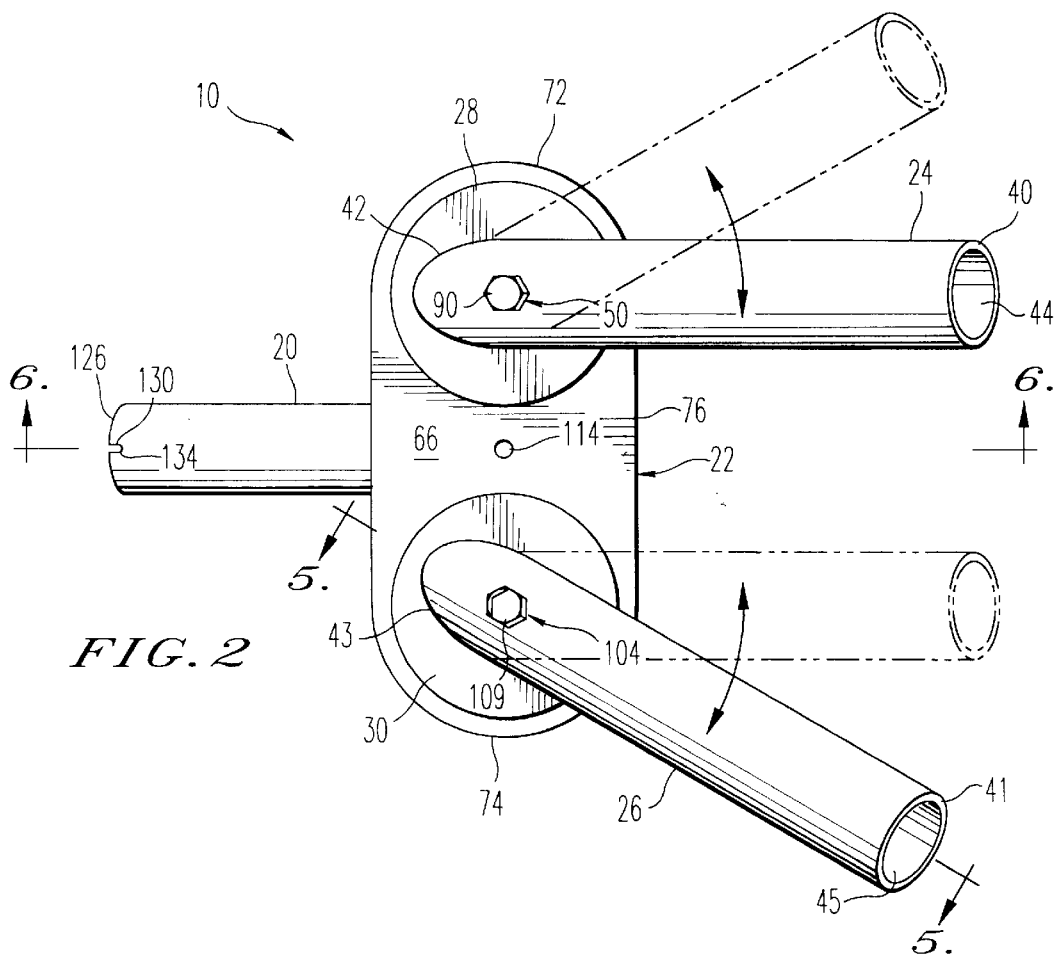
FIG. 2 is a plan view of the rod holder in accordance with a preferred embodiment of the present invention.
Figure 5:
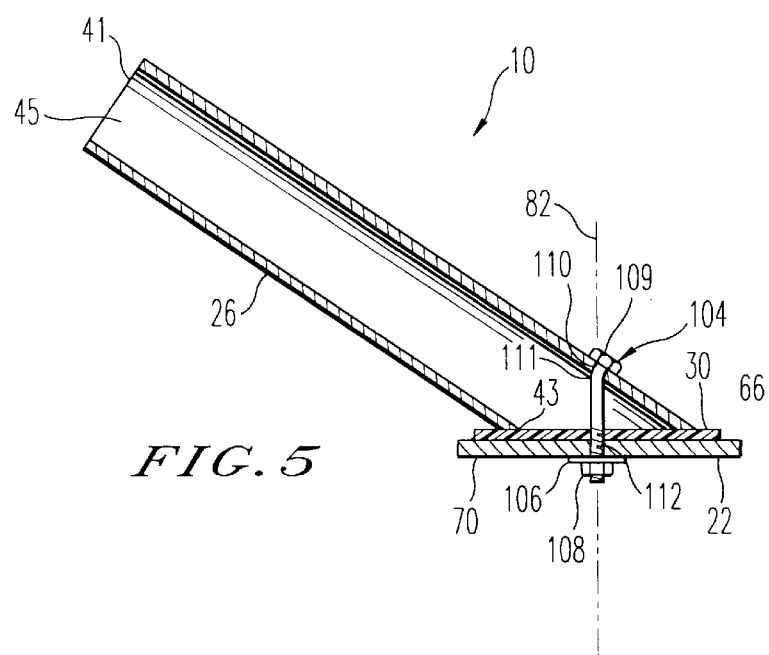
FIG. 5 is a side sectional view of the rod holder taken along line 5—5 of FIG. 2.
Figure 6:
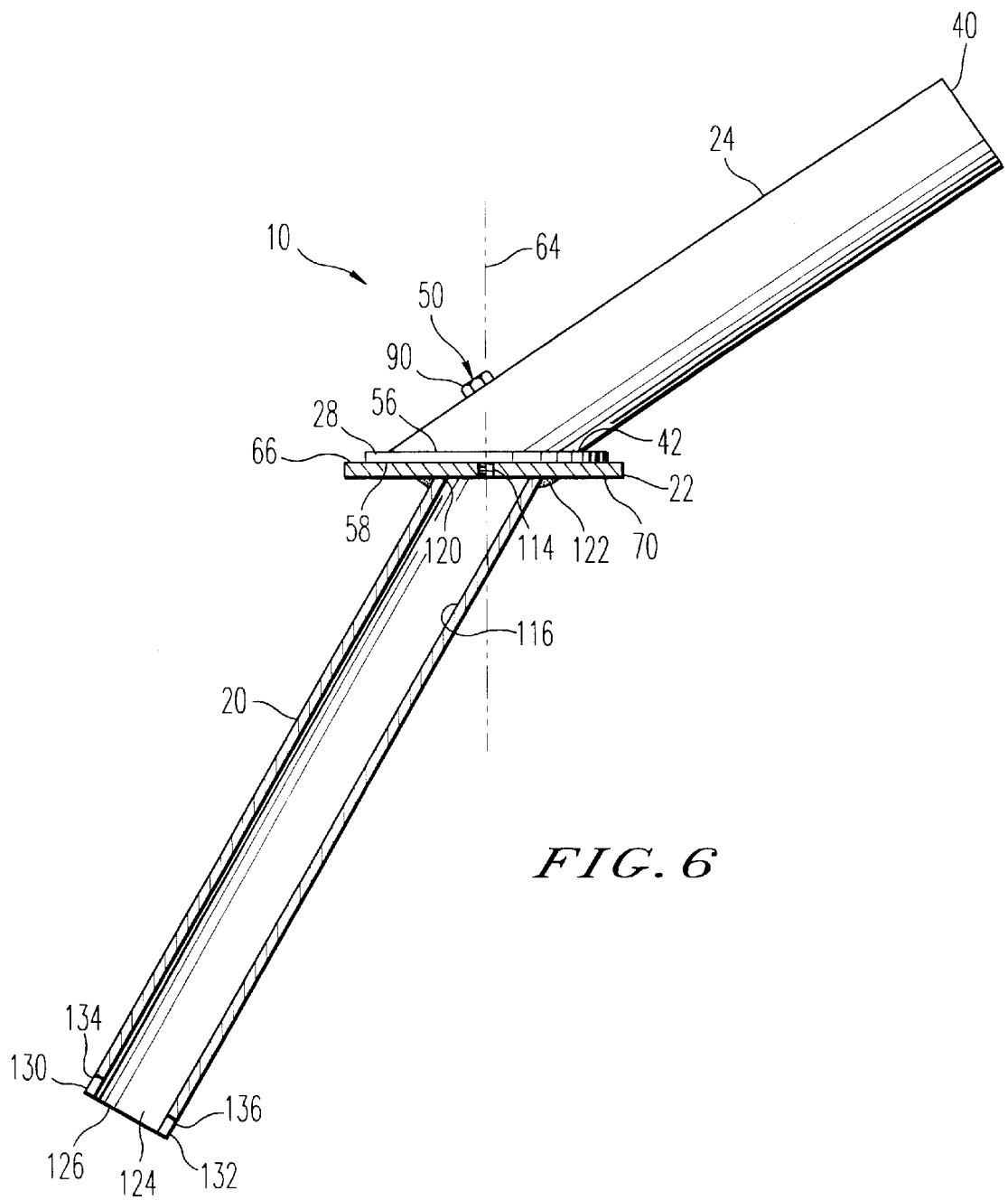
FIG. 6 is a side sectional view of the rod holder taken along line 6—6 of FIG. 2.

As seen in FIGS. 2 and 6, rod receiving member 24 has an upper end 40, a lower end 42, and a cylindrical opening 44 extending completely through the rod receiving member 24 from the upper end 40 to the lower end 42. Likewise, as seen in FIGS. 2 and 5, rod receiving member 26 has an upper end 41, a lower end 43 and a cylindrical opening 45.

Since rod receiving members 24 and 26 are substantially identical, only first rod receiving member 24 will be described in detail. The upper end 40 of rod receiving member 24 is planar and perpendicular to the longitudinal axis of the rod receiving member 24. In use, the upper end 40 receives the butt of a fishing rod. Therefore, the upper end 40 and the rod receiving member 24 are sized accordingly. Alternatively, rod receiving members 24 and 26 may be sized for a specific application, such as for smaller fishing rods. Also, it should be understood that although the rod holder 10 is disclosed as receiving fishing rods 32 and 34, the openings 44 and 45 of the rod receiving members 24 and 26 can receive other items and are not intended to receive only fishing rods. For example, rod receiving members 24 and 26 can support fishing nets or other rod-like items used during fishing or boating.

Figure 7:
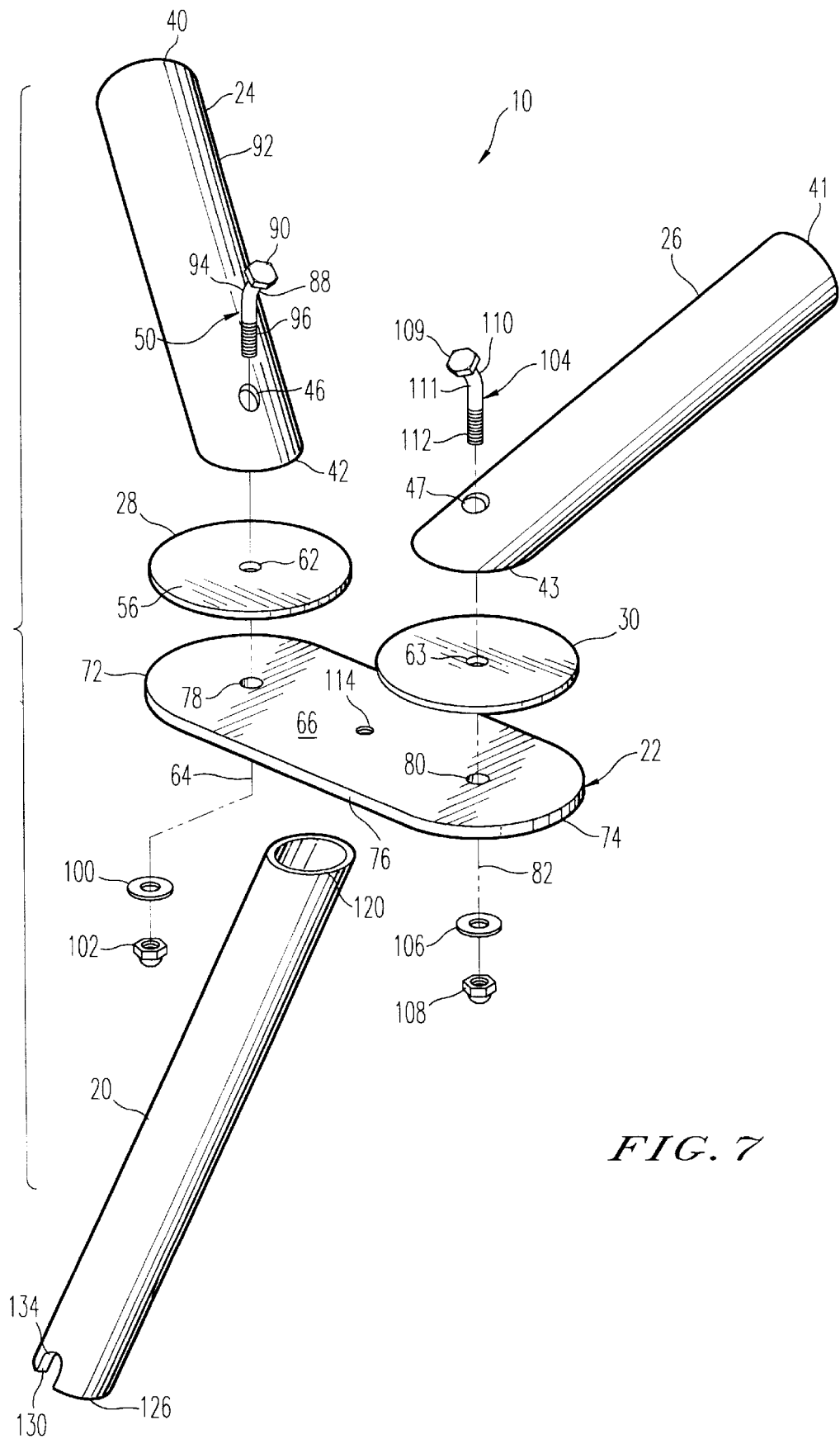
FIG. 7 is a perspective, exploded view of the rod holder in accordance with a preferred embodiment of the present invention.

The lower end 42 of rod receiving member 24 is planar and is beveled such that when the lower end 42 is substantially horizontal, the rod receiving member 24 is positioned at approximately a 45° angle from horizontal. As best seen in FIGS. 7, adjacent the lower end 42, rod receiving member 24 has a fastener hole 46 extending therethrough into the opening 44. Likewise, rod receiving member 26 has a similar fastener hole 47. Fastener hole 46 is positioned to receive a fastening element or bolt 50 that ultimately passes through the lower end 42. Bolt 50 pivotally secures the rod receiving member 24 and the first bearing plate 28 to the platform 22.

Since the bearing plates 28 and 30 are substantially identical, only the bearing plate 28 will be described in detail. As seen in FIGS. 2 and 6, the bearing plate 28 is circular, has an upper surface 56 and a lower surface 58 that act to decrease friction between rod receiving member 24 and platform 22. The bearing plates 28 and 30 are preferably made from an ultrahigh molecular weight ("UHMW") polymeric material. For example, the bearing plate 28 and 30 can be made from UHMW polyethylene or UHMW nylon. Additionally, other materials can be used that adequately reduce friction between the platform 22 and the rod receiving members 24 and 26 to enable those parts to move relative to each other while maintaining sufficient friction to hold the desired relative positions during use.

The lower end 42 of the rod receiving member 24 is secured to the upper surface 56 of the bearing plate 28. The upper and lower surfaces 56 and 58 of bearing plate 28 are substantially flat, planar, and parallel. Bearing plate 28 has a diameter that is large enough to enable the upper surface 56 to completely support the entire extent of the lower end 42 of rod receiving member 24 for any orientation of the rod receiving member 24. The bearing plate 28 also has a fastener hole 62 extending completely therethrough and sized to pivotally receive the bolt 50. Bearing plate 30 has a similar fastener hole 63 extending therethrough. Fastener hole 62 is coaxial with a first pivot axis 64. The pivot axis 64 is substantially perpendicular to the upper and lower surfaces 56 and 58 of bearing plate 28 and is the axis around which rod receiving member 24 pivots.

Figure 3:
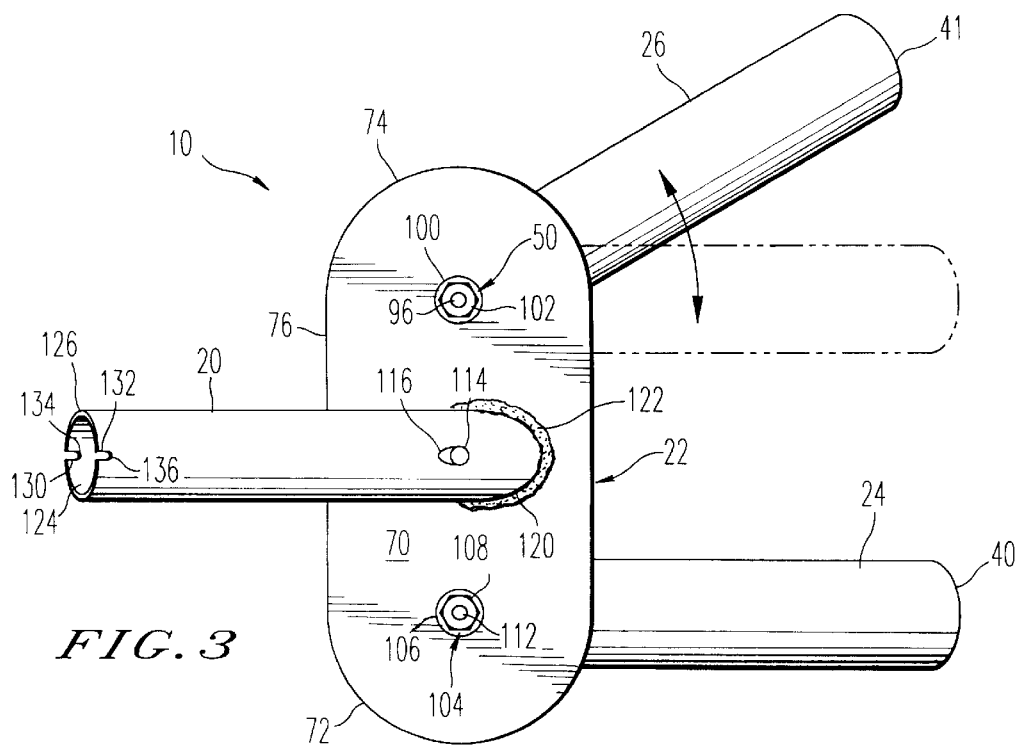
FIG. 3 is a bottom view of the rod holder.
Figure 4:
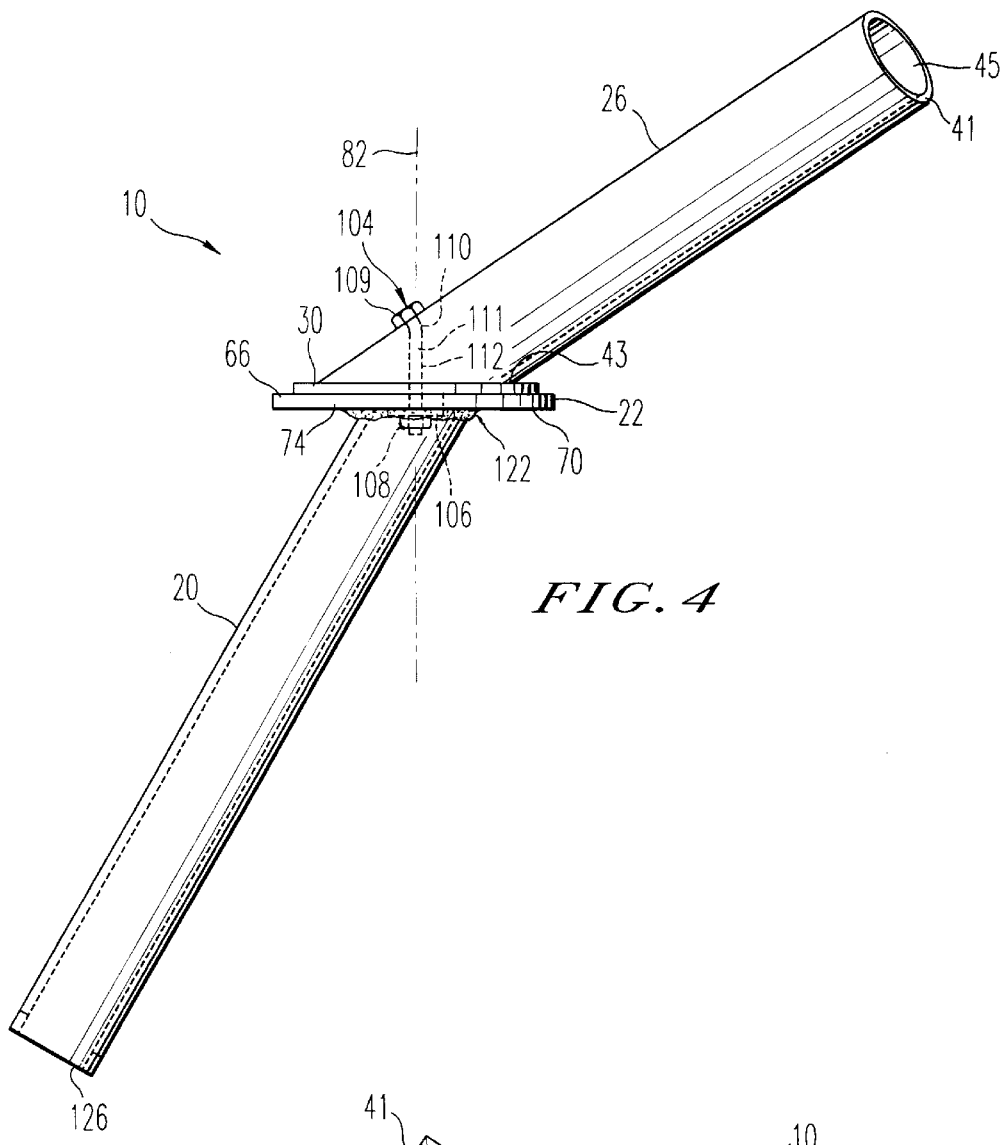
FIG. 4 is a side elevational view of the rod holder.

As seen in FIGS. 2–4, platform 22 has an upper surface 66, a lower surface 70, semi-circular portions 72 and 74, and an extended middle portion 76. The upper and lower surfaces 66 and 70 are each substantially planar, and substantially parallel to each other. The platform 22 is preferably made from aluminum. The two semi-circular portions 72 and 74 are located on either side of the extended middle portion 76 that extends therebetween. The semi-circular portion 72 and the middle portion 76 provide support for rod receiving member 24, while the semi-circular portion 74 and the middle portion 76 provide support for rod receiving member 26. The manner in which the platform 22 interacts and supports the rod receiving member 24 and the bearing plate 28 is substantially identical to the manner in which the platform 22 supports the rod receiving member 26 and the bearing plate 30.

As seen in FIG. 7, the platform 22 also has first and second fastener holes 78 and 80 extending completely through the platform 22. The fastener hole 78 is substantially coaxial with the pivot axis 64 and the fastener hole 62 in the bearing plate 28. Similarly, the fastener hole 80 is coaxial with the fastener hole 63 and a second pivot axis 82 around which the rod receiving member 26 pivots.

As seen in FIGS. 2, 6 and 7, the bolt 50 pivotally fastens the rod receiving member 24 to the bearing plate 28 and the platform 22 such that the rod receiving member 24 can be rotated 360° about the pivot axis 64. The bolt 50 extends through the fastening hole 46 with an upper portion 88 of bolt 50 being coaxial with the fastening hole 46. The head 90 of the bolt 50 is substantially flush with the outer surface 92 of rod receiving member 24 and cannot pass through the fastening hole 46. Adjacent the upper portion 88, the bolt 50 has a bent section 94 so that a lower portion 96 of the bolt 50 is coaxial with and extends through fastener holes 62 and 78.

The bolt 50 is sufficiently long to receive a washer 100 and a nut 102 adjacent the lower surface 70 of platform 22 for securing the bolt 50. The nut 102 is preferably a lock-nut that is tightened to prohibit movement of the rod receiving member 24 in a direction parallel to the pivot axis 64, while enabling the rod receiving member 24 to pivot about the pivot axis 64. The amount of force necessary to move the rod receiving member 24 about the pivot axis 64 may be varied as desired with slight rotation of the nut 102. A bolt 104 having a head 109, an upper portion 110, a bent portion 111, and a lower portion 112, together with a washer 106 and a nut 108 secure the rod receiving member 26 to the bearing plate 30 and the platform 22 in a manner substantially identical to that described above with respect to the bolt 50.

As seen in FIGS. 2, 3 and 6, platform 22 also has a fastening hole 114 located in the center of platform 22 at the mid-point of the extended middle portion 76. The fastening hole 114 extends completely through platform 22 and is coaxial with a fastening hole 116 located in the support 20. These fastening holes 114 and 116 can receive a fastener (not shown), such as a bolt, to secure the support 20 to the platform 22. However, the lower surface 70 of platform 22 is preferably rigidly connected to the upper portion or upper end 120 of support 20 by a fastening element in the form of welding material 122. The upper end 120 of the support 20 is preferably welded around its entire perimeter to the lower surface 70 of the platform 22. Any conventional welding technique can be used.

The support 20 in the illustrated embodiment is a hollow cylindrical tube sized to fit within a conventional gunwale rod holder 16 and is preferably made from aluminum. The support 20 has an opening 124 that extends the entire length of the support 20 from the upper end 120 to a lower end 126.

The upper end of the support 20 is planar and beveled relative to the longitudinal axis of the support 20 such that when the support 20 is inserted within the gunwale rod holder 16, the upper surface 66 of the platform 22 is substantially horizontal.

The lower end 126 of the support 20 is planar and perpendicular to the longitudinal axis of the support 20. Additionally, as best seen in FIG. 3, the lower end 126 is discontinuous around its perimeter since anti-rotational slots 130 and 132 extend from the lower end 126 towards the upper end 120, on opposite sides of the support 20. Slots 130 and 132 are each elongated slots having semi-circular portions 134 and 136, respectively, opening towards the lower end 126 of the support 20. The slots 130 and 132 extend substantially perpendicularly to the lower end 126 and are sized to receive an alignment pin (not shown) that is located within a conventional gunwale rod holder 16. Such alignment pins receive the butt of large game fishing rods to prevent rotation thereof. Likewise, the slots 130 and 131 will engage the alignment pin to prevent rotation of the support 20 and the platform 22 once inserted into the gunwale rod holder 16.

During use, the rod holder 10 is inserted into the gunwale rod holder 16 so that the slots 130 and 131 engage the anti-rotational pin. Fishing rods 32 and 34 are then inserted into the rod receiving members 24 and 26 and can be selectively positioned relative to each other and to the boat 12 as desired. The fishing rod 32 can pivot 360° around pivot axis 64, while the fishing rod 34 can pivot 360° around pivot axis 82. Since the support 20 cannot rotate within the gunwale rod holder 16, the fishing rods 32 and 34 are easily moved about their respective pivot axes 64 and 82 by applying the appropriate force by hand to either the fishing rods 32 and 34 or the rod receiving members 24 and 26.

Although rod receiving members 24 and 26, platform 22, and support 20 have been shown as being made from a metal, such as aluminum, it should be understood that they may be made from other materials of similar or greater strength, such as suitable plastics or composites.

While a particular embodiment has been chosen to illustrate the invention, it will be understood by those skilled in the art that various changes and modifications can be made therein without departing from the scope of the invention as defined in the appended claims.

What is claimed is:

1. A fishing rod holder comprising:
    a platform having a planar upper surface and a lower surface;
    a support having an upper portion and a lower portion, said upper portion rigidly connected to said lower surface of said platform, and said lower portion adapted to be connected to a boat;
    a first rod receiving member having a first upper end, a first side and a first lower end with a first opening;
    a second rod receiving member having a second upper end, a second side, and a second lower end with a second opening;
    a first fastener extending through said first side and extending through said first opening; and
    a second fastener extending through said second side and extending through said second opening,
    said first and second lower ends being coupled to said upper surface of said platform to pivot said first and second rod receiving members about first and second pivot axes, respectively, while prohibiting said first and second rod receiving members from moving relative to said platform in a direction that is parallel to said first and second pivot axes, and said first and second pivot axes being perpendicular to said upper surface, and said first and second lower ends of said first and second rod receiving members being beveled to enable each of said first and second rod receiving members to be positioned at an angle from said planar upper surface of said platform such that said first and second rod receiving members are inclined with respect to said planar upper surface and not substantially perpendicular to said planar upper surfaces, and said first and second rod receiving members being movable relative to each other to avoid entanglement between a first rod received in said first rod receiving member, a second rod received in said second rod receiving member, and the boat, while fishing.

2. A rod holder according to claim 1, wherein said first and second rod receiving members pivot 360° about said first and second pivot axes, respectively.

3. A rod holder according to claim 1, wherein said lower surface of said platform is planar, and said upper portion of said support is beveled.

4. A rod holder according to claim 3, wherein said support is cylindrical.

5. A rod holder according to claim 4, wherein each of said first and second rod receiving members is cylindrical and hollow for receiving an end of a fishing rod.

6. A rod holder according to claim 5, further comprising at least one bearing element positioned between said upper surface of said platform and said first and second lower ends of said first and second rod receiving members.

7. A rod holder according to claim 6, wherein said bearing element comprises first and second bearing plates having a planar upper bearing surface and a planar lower bearing surface.

8. A rod holder according to claim 7, wherein said first and second bearing plates are made from polymeric material.

9. A rod holder according to claim 8, further comprising:
    a third fastening element attaching said support to said lower surface of said platform.

10. A rod holder according to claim 9, wherein:
    said first and second rod receiving members have first and second fastener holes extending therethrough, respectively;
    said first and second bearing plates have third and fourth fastener holes extending therethrough, respectively; and
    said platform has fifth and sixth fastener holes extending therethrough, respectively.

11. A rod holder according to claim 10, wherein said first fastening element comprises a first bolt extending through said first, third, and fifth fastener holes, said second fastener element comprises a second bolt extending through said second, fourth, and sixth fastener holes, and said third fastening element comprises a weld.

12. A rod holder according to claim 1, wherein said lower surface of said platform is planar, and said upper portion of said support is beveled.

13. A rod holder according to claim 12, further comprising a bearing element positioned between said upper surface of said platform and said first and second lower ends of said first and second rod receiving members.

14. A rod holder according to claim 1, further comprising a bearing element positioned between said upper surface of said platform and said first and second lower ends of said first and second rod receiving members.

15. A rod holder according to claim 14, wherein said bearing element comprises first and second bearing plates having a planar upper bearing surface and a planar lower bearing surface.

16. A rod holder according to claim 15, wherein said first and second rod receiving members pivot 360° about said first and second pivot axes, respectively.

17. A rod holder according to claim 16, wherein
said lower surface of said platform is planar, and said upper portion of said support is beveled.

18. A rod holder according to claim 1, wherein
each of said first and second rod receiving members are positioned at an angle of approximately forty-five degrees from said planar upper surface of said platform.

19. A fishing rod holder comprising:
a platform having a planar upper surface and a lower surface;

a support having an upper portion and a lower portion, said upper portion rigidly connected to said lower surface of said platform, and said lower portion adapted to be connected to a boat;

a rod receiving member having an upper end and a beveled lower end;

said beveled lower end being coupled to said upper surface of said platform to pivot said rod receiving member about a pivot axis, while prohibiting said rod receiving member from moving relative to said platform in a direction that is parallel to said pivot axis, and said pivot axis being perpendicular to said upper surface; and a bearing element made from a polymeric material positioned between and directly contacting both said upper surface of said platform and said lower end of said rod receiving member such that said upper surface of said platform does not contact said lower end of said rod receiving member and wherein said rod receiving member is capable of moving relative to said platform to avoid entanglement between a rod received in said rod receiving member and the boat while fishing.

20. A rod holder comprising:
a platform having a planar upper surface, a lower surface, and first and second fastener holes extending completely through said platform;

a support having an upper portion and a lower portion, said upper portion being connected to said lower surface of said platform, and said lower portion being adapted to be connected to a boat;

a first rod receiving member having a first upper end and a first lower end, and a first aperture extending through said first lower end;

a second rod receiving member having a second upper end and a second lower end and a second aperture extending through said second lower end;

said first and second lower ends being coupled to said upper surface of said platform to pivot said first and second rod receiving members about first and second pivot axes, respectively, while prohibiting said first and second rod receiving members from moving relative to said platform in a direction that is parallel to said first and second pivot axes, and said first and second pivot axes being perpendicular to said upper surface; and first and second fastening elements attaching said first and second rod receiving members, respectively, to said upper surface of said platform, said first fastening element extending through said first fastener hole of said platform and said first aperture of said first rod receiving member, said second fastening element extending through said second fastener hole of said platform and said second aperture of said second rod receiving member, each of said first and second fastening elements being integral, unitary members having a substantially linear portion, and said first rod receiving member pivoting about said substantially linear portion of said first fastening element and said second rod receiving member pivoting about said substantially linear portion of said second fastening element.

* * * * *